United States Patent
Jimenez et al.

(10) Patent No.: US 10,836,126 B2
(45) Date of Patent: Nov. 17, 2020

(54) PUNCTURE SEALING AGENT AND PUNCTURE REPAIR SYSTEM

(71) Applicant: SUMITOMO RUBBER INDUSTRIES, LTD., Kobe (JP)

(72) Inventors: Angel J. Jimenez, Hanau (DE); Michael M. Koegler, Hanau (DE); Arnold Eckhardt, Hanau (DE)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 0 days.

(21) Appl. No.: 16/270,209

(22) Filed: Feb. 7, 2019

(65) Prior Publication Data
US 2019/0240937 A1    Aug. 8, 2019

(30) Foreign Application Priority Data
Feb. 7, 2018   (EP) .................................. 18155522

(51) Int. Cl.
| | |
|---|---|
| *B29C 73/16* | (2006.01) |
| *C09J 103/02* | (2006.01) |
| *C09J 11/08* | (2006.01) |
| *C08L 7/02* | (2006.01) |

(52) U.S. Cl.
CPC ............. *B29C 73/163* (2013.01); *C09J 11/08* (2013.01); *C09J 103/02* (2013.01); *C08L 7/02* (2013.01); *C09J 2203/10* (2013.01)

(58) Field of Classification Search
CPC ......... B29C 29/163; C08J 11/08; C09J 11/08; C09J 103/02
USPC ........................................................ 523/166
See application file for complete search history.

(56) References Cited

U.S. PATENT DOCUMENTS

| | | |
|---|---|---|
| 2017/0066206 A1 | 3/2017 | Takahara |
| 2017/0165929 A1 | 6/2017 | Okamatsu et al. |

FOREIGN PATENT DOCUMENTS

| | | | |
|---|---|---|---|
| WO | WO2017075673 | * | 5/2017 |

* cited by examiner

*Primary Examiner* — Edward J Cain
(74) *Attorney, Agent, or Firm* — Birch, Stewart, Kolasch & Birch, LLP

(57) ABSTRACT

A puncture sealing agent is disclosed which comprises natural rubber latex, an aqueous solution of an adhesive, and an antifreezing agent. The natural rubber latex, the aqueous solution of the adhesive and the antifreezing agent are natural components and the adhesive is a carbohydrate.

28 Claims, No Drawings

PUNCTURE SEALING AGENT AND PUNCTURE REPAIR SYSTEM

TECHNICAL FIELD

The present invention is related to a puncture sealing agent having an excellent sealing performance for use in a puncture repair system.

BACKGROUND ART

In tire puncture repair systems a puncture sealing agent is used for sealing punctures in pneumatic tires. The puncture sealing agent is a liquid comprising a solid dispersion and is injected into a damaged tire. The tire is then filled with air with the aid of a compressor and can be used to travel in that condition. When traveling, the puncture sealing agent is shaken within the tire, and as a result, the solid content of the dispersion is deposited to cover the puncture hole.

In recent years the required level of performance for puncture sealing agents has increased. Most of the efforts have been put into improving the sealant performance, injectability, and/or the injectability in low-temperature environments while maintaining ideal storage performance.

It is described in Patent Literature 1 that when the viscosity of the tire puncture sealing agent is low, it rapidly fills the puncture hole. For reducing the viscosity, the tire puncture sealing agent comprises natural rubber latex and a synthetic resin emulsion which is blended with a particular glycol ether.

A removal kit for a tire puncture repair liquid is described in Patent Literature 2. An emulsion coagulant is disclosed which contains α-starch combined with an anionic polyacrylamide to provide a coagulation performance that might help for recovering a tire puncture repair liquid. It is assumed that when the α-starch and the anionic polyacrylamide are compounded into an emulsion, a three-dimensional entanglement is formed, which incorporates emulsion particles and thus promotes coagulation of the emulsion particles.

Puncture sealing agents contain usually synthetic components for improving the sealing performance, injectability and/or the injectability in low-temperature environments while maintaining ideal storage performance. However, using synthetic components is not resource saving and environmentally friendly.

CITATION LIST

Patent Literature

Patent Literature 1: US 2017/0066206 A1
Patent Literature 2: US 2017/0165929 A1

SUMMARY OF INVENTION

Technical Problem

In view of the above, the object underlying the present invention is to provide a puncture sealing agent which is resource saving, environmentally friendly and has a sealing performance, injectability, and injectability in low-temperature environments comparable to conventionally used puncture sealing agents based on synthetic components.

Solution to Problem

In accordance with the present invention, this object is solved by a puncture sealing agent according to claim 1.

The puncture sealing agent according to the present invention comprises natural rubber latex, an aqueous solution of an adhesive and an antifreezing agent. The natural rubber latex, the aqueous solution of the adhesive and the antifreezing agent are natural components and the adhesive is a carbohydrate.

This solution bases on the surprising finding that by combining natural rubber latex and an aqueous solution of a carbohydrate as an adhesive, a puncture sealing agent can be obtained which is at least primarily based on natural components and therefor resource saving and environmentally friendly and provides performance with respect to sealing performance, injectability and/or the injectability in low-temperature environments comparable to puncture sealing agents based on synthetic components. In addition, by using carbohydrates as adhesives, it is possible to significantly reduce the costs for the puncture sealing agent, and the use of dangerous compounds and additives can be avoided. Moreover, disposal of the puncture sealing agent according to the invention after expiry is easy and non-dangerous.

In the context of this application, the term "natural component" refers to compounds that can be found in nature and derivatives of compounds that can be found in nature, i.e. compounds that can be found in nature but which have been modified for example by a chemical reaction.

Another aspect of the present invention is a puncture repair system, comprising the puncture sealing agent according to the present invention.

Preferred embodiments of the present invention are the subject matters of dependent claims.

DESCRIPTION OF EMBODIMENTS

Preferably, the puncture sealing agent comprises 40 to 70 wt % natural rubber latex, more preferably the amount of natural rubber latex is in the range of from 50 to 60 wt % and even more preferably in the range of from 55 to 60 wt %, based on the total weight of the puncture sealing agent. If less than 40 wt % of natural rubber latex is contained in the sealing agent, there is a risk that sealing of the puncture in the tire may be insufficient or too slow and the sealant performance may be deteriorated. However, if the amount of natural rubber latex exceeds 70 wt %, injectability and storage performance of the puncture sealing agent may be deteriorated.

Preferably, in the puncture sealing agent the solid content in the natural rubber latex is from 40 to 80 parts by mass, more preferably the solid content in the natural rubber latex is in the range of from 50 to 70 parts by mass and even more preferably in the range of from 55 to 60 parts by mass, based on 100 parts by mass of the natural rubber latex. With a solid content in the range of 40 to 80 parts by mass, a good balance between sealant performance and storage performance can be obtained.

The natural rubber used in the present invention is not particularly limited, and conventional natural rubber latex can be used. Specific examples of the natural rubber latex include the ones obtained from *Hevea brasiliensis* by tapping, and so-called "deproteinized natural rubber latex", which is a protein-free natural rubber latex. Use of natural rubber latex is particularly preferred, wherein the term "natural rubber latex" also includes deproteinized natural rubber, high purity natural rubber (HPNR) and modified natural rubbers. Examples of the modified natural rubbers include epoxidized natural rubber (ENR), hydrogenated natural rubber (HNR), grafted natural rubber and the like. The natural rubber or HPNR which is generally used in the tire industry such as, for example, SIR20, RSS#3, TSR20 and the like can be used as natural rubber.

Examples of a preparation method of the HPNR include a method of coagulating, washing and drying natural rubber latex which has been subjected to deproteinization, saponification, acid treatment and the like.

According to a preferred embodiment, the puncture sealing agent comprises 8 to 30 wt % of the aqueous solution of the adhesive based on the total weight of the puncture sealing agent, more preferably the amount of the aqueous solution of the adhesive is in the range of from 10 to 25 wt % and even more preferably in the range of from 11 to 17 wt %. If less than 8 wt % of the aqueous solution of the adhesive is used, there is a risk that sealing of the puncture in the tire may be insufficient or too slow. On the other hand, if the amount of the aqueous solution of the adhesive exceeds 30 wt %, storage performance of the puncture sealing agent may be deteriorated.

The puncture sealing agent preferably comprises the antifreezing agent in an amount of 10 wt % or more, more preferably 15 wt % or more, still more preferably 20 wt % or more, particularly preferably 23 wt % or more, but preferably 35 wt % or less, more preferably 33 wt % or less, still more preferably 30 wt % or less, particularly preferably 25 wt % or less based on the total weight of the puncture sealing agent. If less than 10 wt % of the anti-freezing agent is used, injectability in low-temperature environments may suffer. On the other hand, if the amount of the antifreezing agent exceeds 35 wt %, there is the risk that sealing performance may be deteriorated.

Preferably, the content of the antifreezing agent in the puncture sealing agent is from 10 to 500 parts by mass based on 100 parts by mass of the solid content of the natural rubber latex in the puncture sealing agent, more preferably the content of the antifreezing agent is in the range of from 20 to 250 parts by mass and even more preferably in the range of from 50 to 175 parts by mass. The antifreezing agent is not particularly limited, however, preferred examples of the antifreezing agent include ethylene glycol, glycerine, propylene glycol, diethylene glycol, isopropyl alcohol, ethanol and methanol and mixtures of two or more of these.

It is particularly preferred that the puncture sealing agent comprises 40 to 70 wt % natural rubber latex, 8 to 30 wt % of an aqueous solution of a natural adhesive and 10 to 35 wt % of an antifreezing agent (natural antifreezing agent) based on the total weight of the puncture sealing agent. Even more preferably, the puncture sealing agent comprises 50 to 60 wt % natural rubber latex, 10 to 25 wt % of the solution of the adhesive and 20 to 33 wt % of the antifreezing agent based on the total weight of the puncture sealing agent. Most preferably, the puncture sealing agent comprises 55 to 60 wt % natural rubber latex, 11 to 17 wt % of the solution of the adhesive and 23 to 30 wt % of the antifreezing agent based on the total weight of the puncture sealing agent. With the content of the natural rubber latex, the solution of the adhesive and the anti-freezing agent within these ranges, a sealing performance, injectability and injectability in low-temperature environments comparable to conventional puncture sealing agents based on synthetic components can be achieved.

In the puncture sealing agent, the combined content of all natural components of the puncture sealing agent is preferably equal to or greater than 90 wt % based on the total weight of the puncture sealing agent. It is more preferred that the combined content of natural components is equal to or greater than 95 wt % based on the total weight of the puncture sealing agent, particularly preferably equal to or greater than 98 wt % based on the total weight of the puncture sealing agent, even more preferably equal to or greater than 99.5 wt % based on the total weight of the puncture sealing agent and most preferably the puncture sealing agent consists only of natural components. Due to the high content of natural components, the puncture sealing agent is resource saving and environmentally friendly.

It is particularly preferred that in the puncture sealing agent the amount of synthetic resin is less than 3 parts by mass and even more preferably less than 1 part by mass, based on 100 parts by mass of the puncture sealing agent. Most preferably, the puncture sealing agent is free from any synthetic resin. The low content or preferably absence of synthetic resin in the puncture sealing agent allows for a resource saving and environmentally friendly puncture sealing agent which can be easily disposed after expiry.

It is preferable that in the aqueous solution of the adhesive the mass ratio $(Z_a:Z_b)$ of the mass of carbohydrate $(Z_a)$ to the mass of solvent $(Z_b)$ is in the range of from 90:10 to 50:50, more preferably in the range of from 80:20 to 55:40 and even more preferably in the range of from 70:30 to 60:40. If the ratio is greater than 90:10, there is a risk that the viscosity of the aqueous solution of the adhesive may be increased and that the injectability may be deteriorated. However, if the ratio is below 50:50, the time for sealing a puncture may increase and the sealing performance may be deteriorated.

According to a further preferred embodiment of the present invention, the mass of carbohydrate in the puncture sealing agent is in the range of from 5 to 30 parts by mass, more preferably in the range of from 6 to 25 parts by mass and even more preferably in the range of from 7 to 15 parts by mass, based on 100 parts by mass of the puncture sealing agent. If more than 30 parts by mass of carbohydrate are included in the puncture sealing agent, there is a risk that the viscosity of the aqueous solution of the adhesive may be increased and that the injectability may be deteriorated. However, if less than 5 parts by mass of carbohydrate are included in the puncture sealing agent, the time for sealing a puncture may increase and the sealing performance may be deteriorated.

In the puncture sealing agent the carbohydrate is preferably a monosaccharide, an oligosaccharide, a polysaccharide or a mixture thereof. Oligosaccharides are di- to decasaccharides, preferably di- to pentasaccharides. It is preferable that the carbohydrate is selected from the group consisting of sugars, starches, degraded starches and celluloses and mixtures thereof, even more preferably from the group consisting of sugars and degraded starches and mixtures thereof. In accordance with an even more preferred embodiment of the present invention, the carbohydrate is a monosaccharide, an oligosaccharide or a mixture thereof. The monosaccharide may be a triose, tetrose, pentose, hexose, heptose or a mixture thereof, with hexoses, pentoses and mixtures thereof being particularly preferred. Some specific examples for monosaccharides are glycerinaldehyde, dihydroxyacetone, erythrose, threose, erythrulose, ribose, arabinose, xylose, lyxose, ribulose, xylulose, allose, altrose, glucose, mannose, culose, idose, galactose, talose, psicose, fructose, fuculose, sorbose, tagatose, sedoheptulose, mannoheptulose, taloheptulose, alloheptulose, glucoheptose and mannoheptose. Among these monosaccharides mannose, fructose, glucose and mixtures thereof are preferred. Some specific examples for disaccharides include sucrose, lactulose, lactose, maltose, trehalose, cellobiose, chitobiose, kojibiose, nigerose, isomaltose, β,β-trehalose, α,β-trehalose, sophorose, laminaribiose, gentiobiose, turanose, maltulose, palatinose, gentiobiulose, mannobiose, melibiose, melibiulose, rutinose, rutinulose and xylobiose. Among these disaccharides sucrose, lactose and maltose are preferred.

Hydrolysates of starch, for example, glucose syrup and/or glucose-fructose syrup or dextrin are preferably used as the adhesive, since when using these, the costs for the puncture sealing agent are reduced. Dextrin, glucose syrup and glucose-fructose syrup are liquid starch hydrolysates including mono-, di-, and oligosaccharides and can be made from any source of starch, for example from wheat, tapioca and potatoes. Most preferably, the carbohydrate used as an adhesive is sucrose, glucose, fructose or a mixture of two or more of these. The use of sucrose is particularly preferred under the aspect of storage stability.

It is preferred that the puncture sealing agent comprises a surfactant, preferably the amount of surfactant is 1 to 12 wt % based on the total weight of the puncture sealing agent. The lower limit of the amount of surfactant is more preferably equal to or greater than 1.5 wt %, while the upper limit is more preferably equal to or less than 10 wt %, and still more preferably equal to or less than 7 wt %. The surfactant improves the storage stability of the puncture sealing agent, since it prevents unwanted coagulation of rubber particles during storage. If more than 12 wt % surfactant is used, there is a risk that the sealing performance may be deteriorated.

It is particularly preferred that the surfactant is a natural compound. If the surfactant is a natural compound, the puncture sealing agent is resource saving and environmentally friendly. Natural surfactants can be anionic surfactants, amphoteric surfactants, cationic surfactants, nonionic surfactants or mixtures thereof. Most preferably, the natural surfactant comprises at least one nonionic surfactant.

Anionic surfactants have a negatively charged hydrophilic head and some examples of anionic surfactants are sodium sulfates, ammonium sulfates, sulfosuccinates, sarcosines, sarcosinates, isethionates, taurates, alkylbenzenesulfonates, alkylphosphates, and alkenylsuccinates. Amphoteric surfactants have either a positive or negative charge, depending on the pH of the medium. Some examples for amphoteric surfactants are coco betaine, lauryl betaine, hydroxysultaines, alkyl dimethyl betaine and alkyl amide betaine. Cationic surfactants present a positively charged head at the hydrophilic part. Examples for cationic surfactants include chlorides of benzalkonium, stearalkonium, centrimonium and trimethyl ammonium compounds, methyl sulfates, alkylamine acetates, and quaternary ammonium salts. Nonionic surfactants have no ionic charge in their hydrophilic units. Some examples for nonionic surfactants include ethoxylated oxides, wax, emulsifying wax, glyceryl oleate, glyceryl stearate, PEGylated compounds such as cetearehs and sorbitans, lauryl glucoside, polyglucose, polyoxyethylene alcohol ethers, polyoxyethylene fatty acid esters, polyoxyethylenen alkylphenols, and polyoxyethylene¬polyoxypropylene block polymers.

The puncture repair system preferably comprises a container for storing the puncture sealing agent of the present invention and a compressor for filling a tire with air.

EXAMPLES

Subsequently, the present invention is described by means of examples, which do, however, not limit the present patent application.

Preparation of Comparative Example 1 and Examples 1 to 5

A variety of chemicals used in the preparation of the examples are described below:
Natural rubber latex: HA Latex, solid content: 60 mass %, obtained from Centrotrade Minerals & Metals, Inc.
Tackifier: an aqueous dispersion of resin containing resin acids, rosin acids, and potassium salts (solid content: 40 mass %, Aquatac™ dispersion produced by Kraton Corporation)
Carbohydrates: sucrose, fructose and dextrin were obtained from Sigma-Aldrich.
Solution of adhesive B: a solution of sucrose in water in a concentration of 60 g sucrose in 30 g water was prepared under vigorous stirring ($Z_a:Z_b=60:30$).
Solution of adhesive C: a solution of fructose in water in a concentration of 50 g fructose in 50 g water was prepared under vigorous stirring ($Z_a:Z_b=50:50$).
Solution of adhesive D: a solution of dextrin in water in a concentration of 50 g dextrin in 50 g water was prepared under vigorous stirring ($Z_a:Z_b=50:50$).
Solution of adhesive E: a solution of sucrose in water in a concentration of 50 g sucrose in 50 g water was prepared under vigorous stirring ($Z_a:Z_b=50:50$).
Solution of adhesive F: a solution of sucrose in water in a concentration of 70 g sucrose in 30 g water was prepared under vigorous stirring ($Z_a:Z_b=70:30$).
Surfactant: Emulgen 420 manufactured by Kao Corporation
Antifreezing agent: glycerol (non-solid contents, obtained from Merck Millipore).

Tire puncture sealing agents of Examples 1 to 5 and Comparative Example 1 were produced by mixing the components shown in Table 1 below at the proportions listed in Table 1 under vigorous stirring.

TABLE 1

| Compositions | | | | | | |
|---|---|---|---|---|---|---|
| | Amount of component in wt % | | | | | |
| | Comp. Ex. 1 | Ex. 1 | Ex. 2 | Ex. 3 | Ex. 4 | Ex. 5 |
| Natural rubber latex | 55 | 55 | 55 | 55 | 55 | 55 |
| Tackifier | 15.5 | | | | | |
| Solution of adhesive B | | 15.5 | | | | |
| Solution of adhesive C | | | 15.5 | | | |
| Solution of adhesive D | | | | 15.5 | | |
| Solution of adhesive E | | | | | 15.5 | |
| Solution of adhesive F | | | | | | 15.5 |
| Surfactant | 4.5 | 4.5 | 4.5 | 4.5 | 4.5 | 4.5 |
| Antifreezing agent | 25 | 25 | 25 | 25 | 25 | 25 |

The viscosity of the puncture sealing agents according to Comparative Example 1 and Examples 1 to 5 was monitored for an eight-weeks-period finding constant values in the range of 20 to 35 mPa·s. The viscosity was measured in accordance with DIN EN ISO 2555. The density of the puncture sealing agents was measured in accordance with DIN 51757. The results are listed in Table 2.

TABLE 2

| | | Physical properties | |
|---|---|---|---|
| | | Density (g/mL) | Viscosity at 20° C. (mPa · s) |
| Physical properties | Comp. Ex. 1 | 0.996 | 27 |
| | Ex. 1 | 1.021 | 28 |
| | Ex. 2 | 1.029 | 32 |
| | Ex. 3 | 1.015 | 35 |
| | Ex. 4 | 1.015 | 20 |
| | Ex. 5 | 1.033 | 33 |

In order to check the injection ability of the tire puncture sealing agents of Examples 1 to 5 and Comparative Example 1, the content of a 450 mL bottle filled with a tire puncture sealing agent was pumped through a tire valve with the help of a 10 A compressor into a 36 L container to check if the material can be injected trough the tire valve without clogging the tire valve. The ΔPump-values listed in Table 3 represent the differences in pressure between the pressure observed on the side of the 450 mL bottle and the pressure observed on the side of the 36 L container. A smaller value indicates that the material can be better injected. The values listed in Table 3 correspond to the pressure differences measured after 5 minutes at different temperatures.

subjected to intermittent driving. The tire was driven for 5 minutes at a speed no more than 50 km/h and then controlled. The intermittent driving test was repeatedly carried out until there was no more air leakage from the tire, i.e. no bubbling effect observed after spraying water in the vicinity of the puncture hole. Then, the puncture sealing performance was determined based on the time required until no bubbling effect was observed after spraying water, while the loss-of-air performance was determined based on the time required for the tire pressure to equal or exceed the previous tire pressure measurement when it was measured every 5 minutes. The results are listed in Table 3.

To further test the long term performance of the puncture sealing agents, further tests were also carried out after the above-mentioned driving test. Thus, the puncture sealing agents of Example 1 and Comparative Example 1 were injected in damaged tires (205/55 R16 Falken Ziex 914 with a puncture hole having a diameter of 6 mm in the shoulder groove portion of the tread), and a 300 km driving test was performed to evaluate the seal retention performance. As shown in Table 3, after driving 100 km/h for 300 km no air leakage was observed and seal retention was evaluated with +. Hence, the results were fully satisfactory for both puncture sealing agents.

TABLE 3

| | Performance | | | | | | |
|---|---|---|---|---|---|---|---|
| | Injectability | | | Road test | | | Aging |
| | Δ Pump −30° C. (bar) | Δ Pump 25° C. (bar) | Δ Pump +70° C. (bar) | Puncture sealing | Loss of air | Seal retention | Storage properties |
| Comp. Ex. 1 | 0.18 | 0.10 | 0.15 | A | AA | + | L |
| Ex. 1 | 0.2 | 0.10 | 0.15 | A | AA | + | L |
| Ex. 2 | 0.21 | 0.11 | 0.18 | B | B | | SC |
| Ex. 3 | 0.20 | 0.12 | 0.16 | B | A | | SC |
| Ex. 4 | 0.19 | 0.10 | 0.15 | B | A | | L |
| Ex. 5 | 0.22 | 0.15 | 0.19 | A | A | | L |

The puncture sealing performance and loss-of-air performance were evaluated using the following criteria: "AA": sealing was successfully accomplished after no more than 5 minutes; "A": sealing was successfully accomplished after more than 5 minutes and not more than 10 minutes; "B": sealing was successfully accomplished after more than 10 minutes and not more than 15 minutes; "C": sealing was successfully accomplished after more than 15 minutes and not more than 30 minutes. The results are listed in Table 3.

Storage properties were tested by performing accelerated stability tests causing the true state of the dispersion to change or at least to be stressed. In the accelerated stability tests, prepared puncture sealing agent samples were allowed to stand for 15 days at a temperature of 70° C. The changes in state of the puncture sealants were visually evaluated on a four-point scale: L (remained liquid), SC (changed to slightly creamy), C (changed to be creamy) and S (solidified). The results are listed in Table 3.

Road tests were performed on dry asphalt using 205/55 R16 Falken Ziex 914 tires at temperatures greater than 30° C. A puncture hole having a diameter of 6 mm was made in the shoulder groove portion of the tread of a tire. Next, 450 mL of the puncture sealing agent was injected via the tire valve and the tire was filled with the aid of a compressor until a pressure of 2.5 bar was reached. The tire was then As can be seen from the results listed above in Table 3, the puncture sealing agents according to Examples 1 to 5 which are completely based on natural components show an injectability, puncture sealing performance and storage properties acceptable compared to Comparative Example 1 which includes synthetic components. Accordingly, the puncture sealing agents according to the present application are a resource saving replacement for conventional puncture sealing agents which are based on non-natural compounds.

The invention claimed is:

1. A puncture sealing agent, comprising: natural rubber latex, an aqueous solution of an adhesive, and an antifreezing agent,
   wherein the natural rubber latex, the aqueous solution of the adhesive, and the antifreezing agent are natural components, and
   the adhesive is a carbohydrate,
   wherein the mass of carbohydrate in the puncture sealing agent is in the range of from 5 to 30 parts by mass based on 100 parts by mass of the puncture sealing agent.
2. The puncture sealing agent according to claim 1,
   wherein the combined content of all natural components of the puncture sealing agent is equal to or greater than 90 wt % based on the total weight of the puncture sealing agent.

3. The puncture sealing agent according to claim 1, wherein the puncture sealing agent comprises 40 to 70 wt % natural rubber latex based on the total weight of the puncture sealing agent.

4. The puncture sealing agent according to claim 1, wherein the puncture sealing agent comprises 8 to 30 wt % of the aqueous solution of the adhesive based on the total weight of the puncture sealing agent.

5. The puncture sealing agent according to claim 1, wherein the puncture sealing agent comprises 10 to 35 wt % of the antifreezing agent based on the total weight of the puncture sealing agent.

6. The puncture sealing agent according to claim 1, wherein the puncture sealing agent comprises 40 to 70 wt % natural rubber latex, 8 to 30 wt % of an aqueous solution of a natural adhesive, and 10 to 35 wt % of an antifreezing agent, wt % being based on the total weight of the puncture sealing agent.

7. The puncture sealing agent according to claim 1, wherein the puncture sealing agent is free from any synthetic resin.

8. The puncture sealing agent according to claim 1, wherein in the aqueous solution of the adhesive, the mass ratio ($Z_a:Z_b$) of mass of carbohydrate ($Z_a$) to mass of solvent ($Z_b$) is in the range of from 90:10 to 50:50.

9. The puncture sealing agent according to claim 1, wherein the carbohydrate is selected from the group consisting of sugars, starches, degraded starches and celluloses and mixtures thereof.

10. The puncture sealing agent according to claim 1, wherein the carbohydrate is sucrose, glucose, fructose or a mixture thereof.

11. The puncture sealing agent according to claim 1, wherein the puncture sealing agent comprises a surfactant.

12. The puncture sealing agent according to claim 1, wherein the solid content in the natural rubber latex is from 40 to 80 parts by mass based on 100 parts by mass of the natural rubber latex.

13. The puncture sealing agent according to claim 1, wherein the content of antifreezing agent is from 10 to 500 parts by mass based on 100 parts by mass of solid content of the natural rubber latex in the puncture sealing agent.

14. The puncture sealing agent according to claim 1, wherein the carbohydrate is selected from the group consisting of sugars and degraded starches and mixtures thereof.

15. A puncture repair system, comprising the puncture sealing agent according to claim 1.

16. A puncture sealing agent, comprising: natural rubber latex, an aqueous solution of an adhesive, and an antifreezing agent, wherein the natural rubber latex, the aqueous solution of the adhesive, and the antifreezing agent are natural components, and the adhesive is a carbohydrate, wherein the carbohydrate is sucrose, glucose, fructose or a mixture thereof.

17. The puncture sealing agent according to claim 16, wherein the combined content of all natural components of the puncture sealing agent is equal to or greater than 90 wt % based on the total weight of the puncture sealing agent.

18. The puncture sealing agent according to claim 16, wherein the puncture sealing agent comprises 40 to 70 wt % natural rubber latex based on the total weight of the puncture sealing agent.

19. The puncture sealing agent according to claim 16, wherein the puncture sealing agent comprises 8 to 30 wt % of the aqueous solution of the adhesive based on the total weight of the puncture sealing agent.

20. The puncture sealing agent according to claim 16, wherein the puncture sealing agent comprises 10 to 35 wt % of the antifreezing agent based on the total weight of the puncture sealing agent.

21. The puncture sealing agent according to claim 16, wherein the puncture sealing agent comprises 40 to 70 wt % natural rubber latex, 8 to 30 wt % of an aqueous solution of a natural adhesive, and 10 to 35 wt % of an antifreezing agent, wt % being based on the total weight of the puncture sealing agent.

22. The puncture sealing agent according to claim 16, wherein the puncture sealing agent is free from any synthetic resin.

23. The puncture sealing agent according to claim 16, wherein in the aqueous solution of the adhesive, the mass ratio ($Z_a:Z_b$) of mass of carbohydrate ($Z_a$) to mass of solvent ($Z_b$) is in the range of from 90:10 to 50:50.

24. The puncture sealing agent according to claim 16, wherein the mass of carbohydrate in the puncture sealing agent is in the range of from 5 to 30 parts by mass based on 100 parts by mass of the puncture sealing agent.

25. The puncture sealing agent according to claim 16, wherein the puncture sealing agent comprises a surfactant.

26. The puncture sealing agent according to claim 16, wherein the solid content in the natural rubber latex is from 40 to 80 parts by mass based on 100 parts by mass of the natural rubber latex.

27. The puncture sealing agent according to claim 16, wherein the content of antifreezing agent is from 10 to 500 parts by mass based on 100 parts by mass of solid content of the natural rubber latex in the puncture sealing agent.

28. A puncture repair system, comprising the puncture sealing agent according to claim 16.

* * * * *